United States Patent [19]

Giardina

[11] 4,253,516

[45] Mar. 3, 1981

[54] MODULAR HEAT EXCHANGER

[75] Inventor: Angelo R. Giardina, Marple Township, Delaware County, Pa.

[73] Assignee: Westinghouse Electric Corp., Pittsburgh, Pa.

[21] Appl. No.: 918,126

[22] Filed: Jun. 22, 1978

[51] Int. Cl.³ .............................................. F28F 9/02
[52] U.S. Cl. ...................................... 165/78; 165/81; 165/162
[58] Field of Search .................... 165/78, 114, 81, 145, 165/162, 172

[56] References Cited

U.S. PATENT DOCUMENTS

| | | | |
|---|---|---|---|
| 1,780,294 | 11/1930 | Davis, Jr. | 165/82 |
| 2,036,957 | 4/1936 | Price | 165/81 |
| 2,152,266 | 3/1939 | McNeal | 165/81 X |
| 2,176,406 | 10/1939 | McCullough | 165/172 X |
| 2,384,714 | 9/1945 | Villiger | 165/145 X |
| 2,729,433 | 1/1956 | Berg | 165/78 X |
| 3,338,052 | 8/1967 | Holden | 165/114 X |
| 3,586,549 | 10/1976 | Huggins et al. | 165/82 |
| 3,595,310 | 7/1971 | Burne et al. | 165/181 |
| 4,105,065 | 8/1978 | Chirico | 165/78 |
| 4,134,450 | 1/1979 | Boyer et al. | 165/145 X |

Primary Examiner—Stephen Marcus
Attorney, Agent, or Firm—F. J. Baehr, Jr.

[57] ABSTRACT

A shell and tube heat exchanger having a plurality of individually removable tube bundle modules. A lattice of structural steel forming rectangular openings therein is placed at each end of a cylindrical shell. Longitudinal structural members are placed in the shell between corners of the rectangular openings situated on opposite ends of the shell. Intermediate support members interconnect the longitudinal supports so as to increase the longitudinal supports rigidity. Rectangular parallelpiped tube bundle moldules occupy the space defined by the longitudinal supports and end supports and each include a rectangular tube sheet situated on each end of a plurality of tubes extending therethrough, a plurality of rectangular tube supports located between the tube sheets, and a tube bundle module stiffening structure disposed about the bundle's periphery and being attached to the tube sheets and tube supports. The corners of each tube bundle module have longitudinal framework members which are mateable with and supported by the longitudinal support members. Intermediate support members constitute several lattice, each of which is situate d in a plane between the end support members. The intermediate support members constituting the several lattice extend horizontally and vertically between longitudinal supports of adjacent tube module voids. An alternative embodiment for intermediate support members constitute a series of structural plates situated at the corners of the module voids and having recesses therein for receiving the respective longitudinal support members adjacent thereto, protrusions separating the recesses, and a plurality of struts situated between protrusions of adjacent structural plates.

4 Claims, 12 Drawing Figures

MODULAR HEAT EXCHANGER

GOVERNMENT CONTRACT

The invention described herein is believed to have been conceived under, or in the course of, contract EG-77-C-03-1569 with the U.S. Department of Energy.

BACKGROUND OF THE INVENTION

1. Field of the Invention:

This invention relates to heat exchangers and more particularly to modularized construction therefor and associated tube bundle module-shell support members.

2. Description of the Prior Art:

Alternatives to conventional power generation schemes have been sought in recent years. A concept called Ocean Thermal Energy Conversion (hereafter referred to as OTEC) has, as of late, been thoroughly evaluated as to its feasibility in commercial applications. OTEC generally utilizes natural temperature differences (as much as 40° F,) between ocean surface and subsurface waters to develop a pressure difference across a turbine through which a vapor is expanded and whose expansion energy is converted to mechanical energy for rotating a generator.

Open or closed cycles utilizing the OTEC power generation principle can be utilized to advantage under various circumstances. Closed cycle OTEC systems require isolation of the primary, expandible fluid from the environment and thus necessitates the use of heat exchangers for the motive fluid to absorb heat from and reject heat to the relatively warm surface waters and relatively cold subsurface waters respectively.

Due to the small temperature differences available for heat transfer, extremely large evaporators (vapor generators) and condensers are required. To effectively separate the ocean water from the motive fluid shell and tube heat exchangers have been selected and have been identified as the most costly pieces of capital equipment utilized in closed cycle OTEC systems. Development of a cost effective heat exchanger design is absolutely essential if an economically viable OTEC power system is to be achieved.

The major problem areas for developing extremely large shell and tube heat exchangers were fabrication and welding problems, high cost of alignment and special coordination of large internal parts, shell assembly, and tube insertion on the ship to be used for OTEC, supplying uniform motive fluid distribution with a minimum of nozzles, and obtaining suitable tube supports for preventing tube vibration failures. After considering the aforementioned problems and investigating their solutions by utilizing conventional power plant heat exchanger practice, it was decided to lower cost shop fabrication (compared with field fabrication), fabricate parts and subassemblies which are commercially shippable, and develop liquid distribution and collection systems for the heat exchangers' shell side that are less costly than previous designs.

A modularized unit for use in heat exchangers was illustrated in U.S. Pat. No. 3,595,310 which issued July 27, 1971. Such modular unit utilized tubes embedded within pervious metal but can be very costly in their manufacture and result in extensive field labor insertion. U.S. Pat. No. 3,986,549, which issued Oct. 19, 1976, illustrates a modularized gas-to-gas heat exchanger support structure. Such support structure does not, however, suggest how to support the actual heat exchanger surface within an enclosing shell member.

SUMMARY OF THE INVENTION

In accordance with the present invention, a modularized shell and tube heat exchanger is provided which maximizes shop fabrication of components and minimizes field assembly thereof, has parts and modularized subassemblies which are commercially shippable, and a support structure for tube bundle modules which promotes their insertion during field assembly. The invention generally comprises a cylindrical shell member, a suitable number of tube bundle modules situated within the shell with tube bundle module stiffening structures attached to the tube bundle modules' outer peripheries for maintaining their rigidity, and a support structure disposed in the shell for supporting the tube bundle modules. Each tube bundle module has two tube sheets connected by a plurality of tubes which are supported at selected locations between the tube sheets by tube supports. The support structure includes end, intermediate, and longitudinal members. The end members are disposed across each end of the shell and are connected thereto in planes perpendicular to the shell's longitudinal axis to form a lattice at each end of the shell with openings therein. The longitudinal members are disposed between the end lattice members parallel to the shell's axis and, together with the end members, define a plurality of voids into which the tube bundle modules are receivable. The intermediate support members lie in a plurality of planes perpendicular to the shell's axis with a portion thereof being connected to the shell and longitudinal members so as to provide support to both. Each of the tube bundle module's stiffening structures constitutes longitudinal framework members secured to the tube sheets and the intermediate tube supports. Transverse framework members diagonally connect the longitudinal framework members along the modules' sides with the transverse members being secured to the edges of the tube supports and at least one longitudinal framework member.

In a preferred embodiment of the invention the intermediate support members include structural support plates each disposed at the corners of the tube bundle modules. Such structural plates have recesses for receiving the longitudinal support members and protrusions separating the recesses. A plurality of struts are disposed between the protrusions of adjacent structural plates. Such intermediate support structure disposed in each of several planes perpendicular to the shell's axis provides support for the longitudinal support members and is amenable to easy assembly and accurate positioning of the longitudinal support members.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENT

The present invention is concerned primarily with heat exchangers (both evaporators and condensers) used in an ocean thermal energy conversion closed cycle (OTEC) cycle. In the exemplary tube bundle module's size description, the evaporator's tube bundle will be specified since it differs in its dimensions from the condensor's tube bundle. Such heat exchangers will be placed on ocean platforms or ships which will not be referred to herein. Accordingly, portions of the description which follows will refer to ocean water as a heat source and heat sink and anhydrous ammonia as the subject cycle's primary, motive fluid. It should be understood, however, that the present invention heat exchanger may be utilized in any application requiring the advantages that the present invention can provide in utilizing any fluid therein when appropriate materials are chosen for its construction.

Figure 1A:
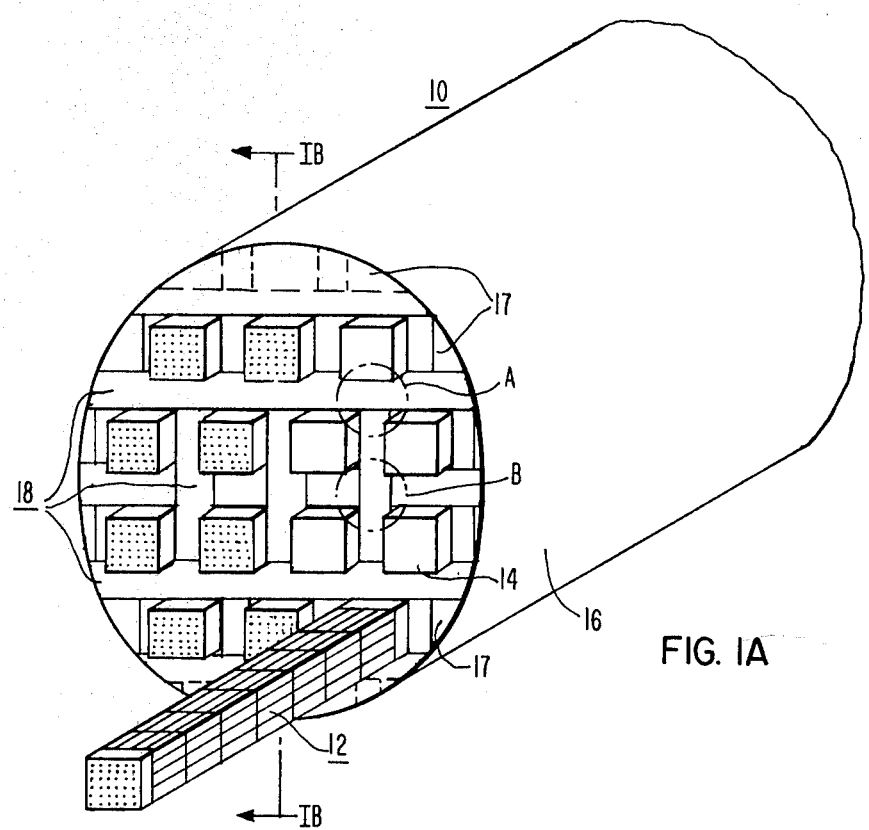
FIG. 1A is a pictorial view of the present invention modular heat exchanger.
Figure 1B:
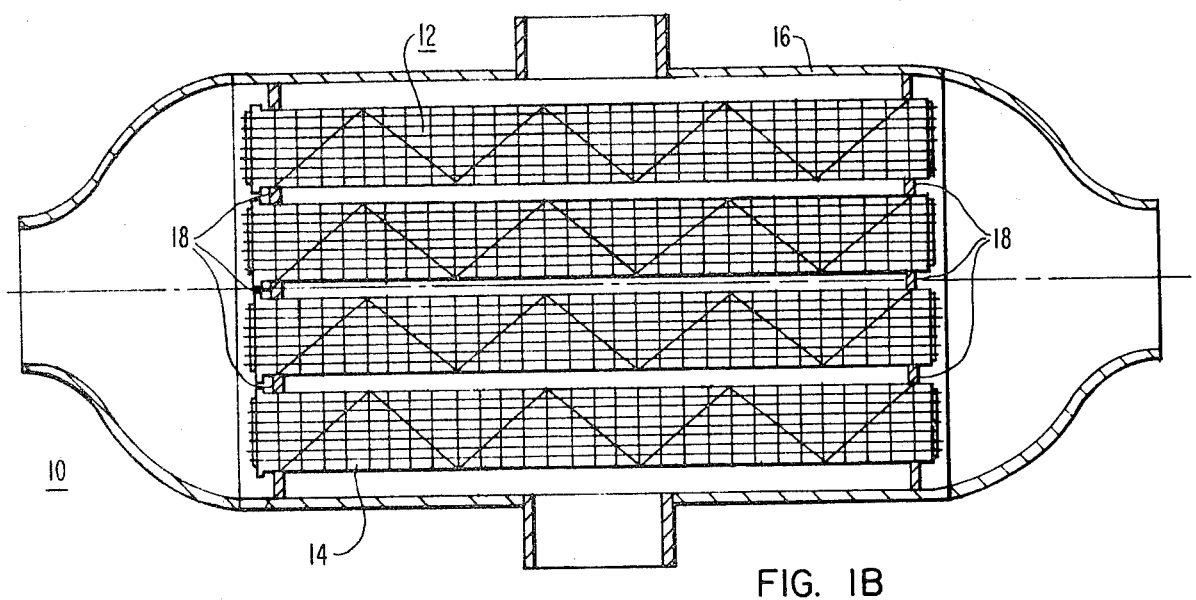
FIG. 1B is a longitudinal partial sectional view of the heat exchanger illustrated in FIG. 1A.

FIGS. 1A and 1B represent modularized heat exchanger 10 which will include, when fully assembled, 14 tube bundle modules 12. While channel heads are illustrated in FIG. 1B to provide clarifying structure, they were deleted from FIG. 1A to emphasize that any manifolding apparatus may be used to commonly supply all tube bundle modules 12 simultaneously. Eight of the tube bundle modules are shown in their inserted, assembled configuration while a ninth tube bundle module is shown as being partially inserted into the rectangularly shaped voids 14. Such voids extend substantially the entire length of the cylindrical shell member 16. Closure plates 17 are welded to shell 16 and end support structure 18 in the peripheral areas about the tube bundle modules 12 to prevent mixing of the tube side and shell side fluids. Fourteen tube bundle modules 12 are illustrated in FIG. 1A, it is to be understood that fourteen tube bundle modules were chosen as the optimum percentage occupation for the inside of shell 16 and any number of tube bundle modules per shell may be utilized. Intermediate and longitudinal support structures have been deleted from FIG. 1B for purposes of clarity.

Figure 4B:
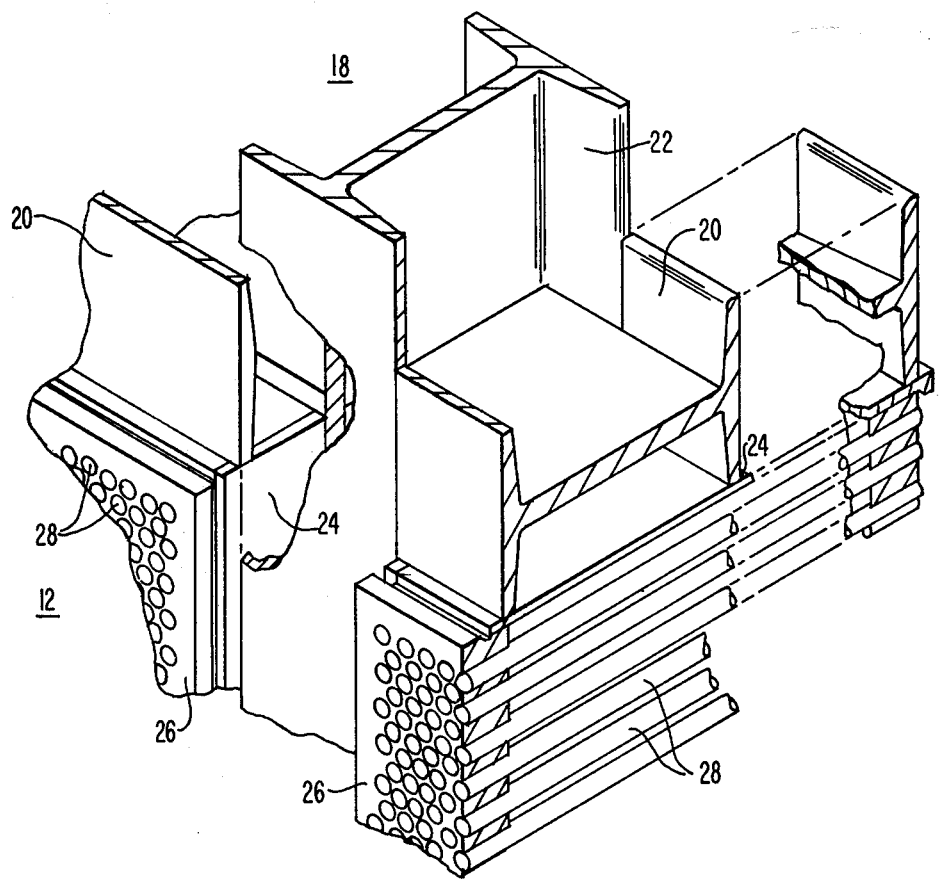
FIGS. 4A and 4B illustrate typical portions of the heat exchangers and support structure for vertically offset and vertically aligned tube bundle modules.
Figure 4A:
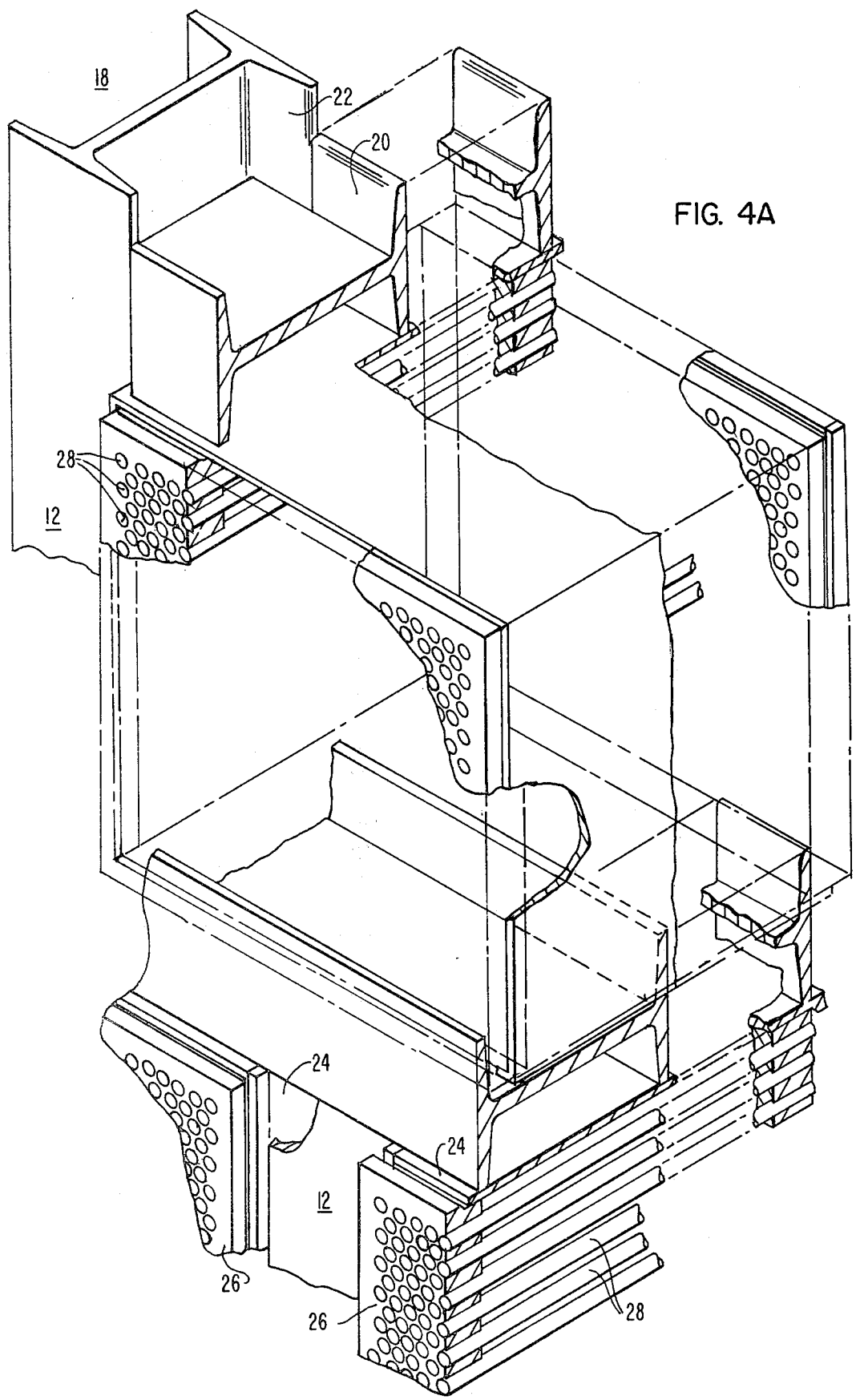

Lattice 18 comprises structural steel and is disposed on each end of shell 16 to form the preferred, illustrated rectangular openings for reception of the tube bundle modules 12. Typical intersections of such end support structure 18 are better illustrated in FIGS. 4A and 4B which show enlarged typical portions of end support structure 18 for the cases where vertically adjacent tube bundle modules 12 are horizontally offset and where they are horizontally aligned, respectively. End support structure 18, better illustrated in FIGS. 4A and 4B, include horizontal structural steel members 20, vertical structural steel members 22, and structural steel box members 24. Structural end support structure 18 is welded together to form a lattice on each end of shell 16 as illustrated in FIG. 1A. A typical example of the end support structure 18's configuration illustrated in FIG. 4A is location A in FIG. 1A or at any horizontally offset, vertically misaligned tube bundle modules 12. The end support structure 18 having the configuration of FIG. 4B may be seen to occur by example at location B of FIG. 1A. Horizontal end support members 20 are welded to shell 16 and vertical end support members 22 are, in turn, also welded to shell 16. Box members 24 constitute four-sided plate members which are welded to end support members 20 and 22 to provide additional strength thereto. While I beams are shown as constituting the end support members 20 and 22, it is to be understood that other structural steel sections could be utilized with equal facility for any given application.

Figure 2:
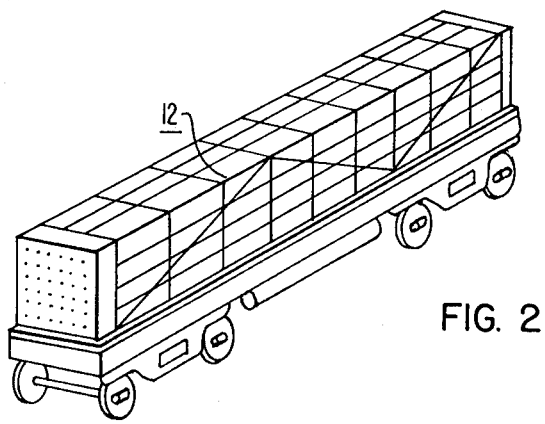
FIG. 2 is a pictorial representation of a single tube bundle module loaded on a typical railway car.

FIG. 2 illustrates a typical tube bundle module 12 resting on a railroad car. While the shape of shell 16 was chosen to be cylindrical to obtain the advantages of minimum wall thickness and cost other shell shapes (rectangular square etc.) may also be used. Tube bundle modules 12 of nearly square cross section (12 feet 4 inches $\times$ 11 feet $5\frac{1}{2}$ inches) when viewed from the axial end of the shell were chosen to utilize the maximum shell cross-sectional area, provide uniformity of design, and have a maximum width of $12\frac{1}{3}$ feet so as to facilitate rail shipment of a completed tube bundle module 12 as shown in FIG. 2. Tube bundle modules 12 of other shapes may also be utilized to accomplish the aforementioned objectives.

Figure 3:
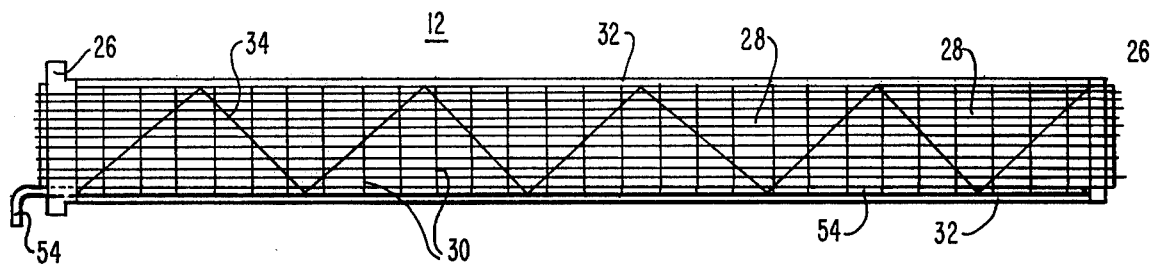
FIG. 3 is a transverse elevation view of such tube bundle module shown in FIG. 2.
Figure 9:
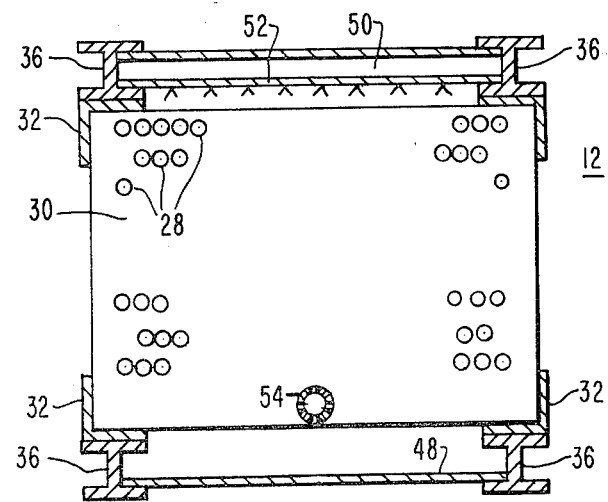
FIG. 9 is an end view of a typical evaporator tube bundle module and its associated fluid distribution chamber and condensate collection tray.

FIG. 3 illustrates a transverse elevation view of a tube bundle module 12. Square tube sheets 26 are shown disposed at each end of a square bundle of tubes 28 which extend therethrough and are suitably connected thereto to prevent fluid intrusion into the shell 16's interior of fluid normally being utilized on the tubes' interior. At predetermined planes between tube sheets 26 are disposed tube supports 30 which have holes therein for receiving tubes 28 so as to prevent tube vibration. Structural steel angles 32, better illustrated in FIG. 9, are disposed about the outer periphery of the tube bundle module 12 at each corner thereof and are preferably welded to tube sheets 26 and tube supports 28. Transverse frame members 34 are diagonally disposed along the outer periphery of tube bundle module 12 and extend between longitudinal framework members 32. Transverse framework members 34 are connected to the adjacent tube supports 30 so as to increase the rigidity and maintain the shape of the tube bundle module 12. By way of example, the illustrated tube bundle module has 14,036 1 inch diameter- .028 inch wall titanium tubes which are welded to two-inch thick carbon steel tube plates 26 having titanium cladding on their outward facing sides. Exemplary tube supports 30 are $\frac{1}{2}$ inch thick carbon steel and are spaced, centerline to centerline, 36 inches apart. Longitudinal framework members 32 comprise 6-inch $\times$ 6-inch $\times$ 1-inch carbon steel structural angles and transverse framework members 34 comprise 6-inch $\times$ 1-inch carbon steel straps.

The present invention is, however, considered to include the use of aluminum or any other tube material desired. The tube sheets 26 must be clad with a material compatible with the tube to facilitate tube welding if desired. All other parts of the shell 16 can be constructed of carbon steel or other materials compatible with the shell side fluid.

Longitudinal support members 36 whose axial cross sections appear in FIGS. 5-9 extend parallel to shell 16's axis and are connected at either end to end support structure 18. Specifically, longitudinal support members 36 preferably comprise I beams which are connected to the corners of structural box members 24. Assembling tube bundle module 12 (illustrated in FIG. 3) into void 14 with its right end inserted first causes the longitudinal framework members 32 to ride on the bottom two longitudinal support members 36 with the top two longitudinal support members 36 restraining tube bundle module 12 movement in the upward direction. Longitudinal support members 36 act as rails and permit easy insertion of the tube bundle modules 12 into void 14 which extends into shell 16 as illustrated in FIG. 1A. FIGS. 5–8 need only illustrate the upper half of shell 16 due to the symmetry involved.

Figure 5:
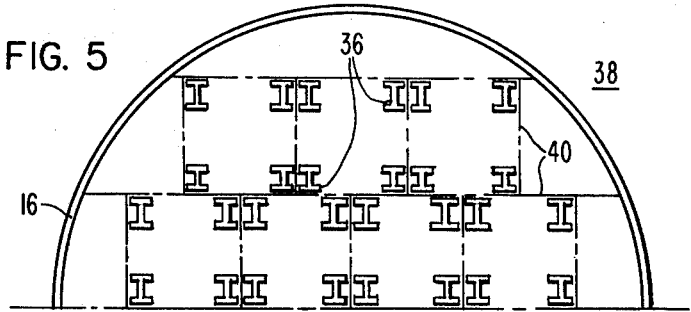
FIGS. 5 and 6 illustrate alternate intermediate support structures for vertically offset tube bundles.
Figure 6:
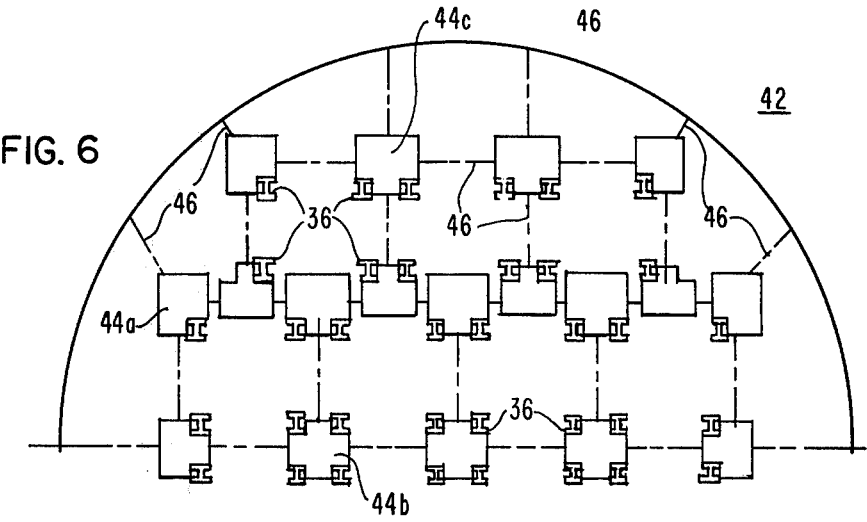
Figure 7:
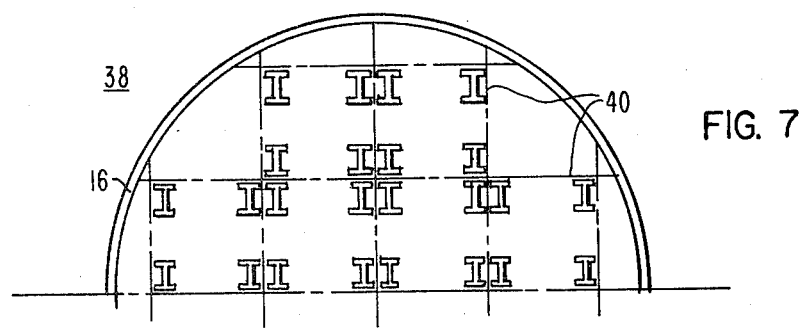
FIGS. 7 and 8 illustrate alternate intermediate support structures analogous to those of FIGS. 5 and 6 for vertically aligned tube bundle modules.
Figure 8:
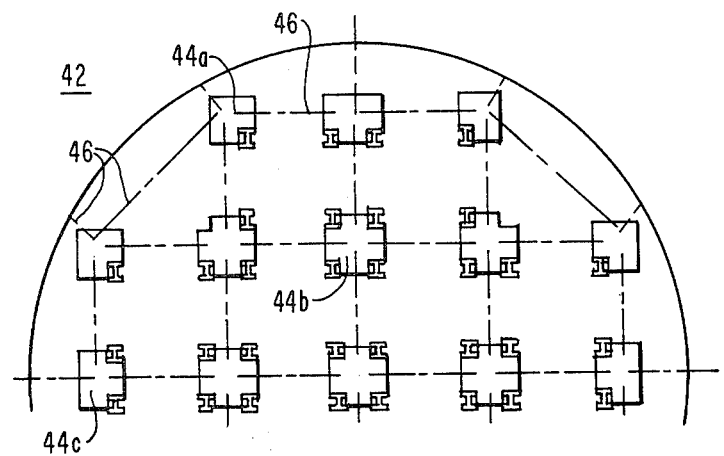

An intermediate support structure is disposed above and below longitudinal support members 36 and on either side thereof to augment the strength of longitudinal supports 36. The intermediate support structure is disposed in planes perpendicular to shell 16's axis at predetermined locations between tube sheets 26. FIGS. 5 and 7 illustrate one type of intermediate pipe support structure 38 for the cases of vertically misaligned and aligned tube bundle modules respectively. Heavy wall pipe 40 forms a rectangular lattice. The heavy wall pipe 40 intersect each other and the shell and must be miter welded and fillet welded at those locations respectively. Intermediate support structure 42 is illustrated in FIGS. 6 and 8 and is the more preferred. FIGS. 6 and 8 again illustrate the differences in intermediate support structure 42 for the cases of vertically misaligned and vertically aligned tube bundle modules respectively. Intermediate support structure 42 illustrated in FIG. 6 utilizes structural plates 44a, 44b, and 44c which constitute L-shaped, X-shaped, and T-shaped sections, respectively. The L sections each have one recess for the reception of longitudinal support members 36, the X sections have four of such recesses, and the T sections have two of such recesses. Plates 44a have two protrusions on either side of their recess, structural plates 44b have four protrusions which separate their four recesses, and structural plates 44c have three protrusions which bound their recesses. The protrusions of adjacent structural plates 44a, 44b, and 44c are interconnected with struts which, by example, constitute four-inch diameter heavy wall carbon steel pipe 46. Such pipe struts 46 also connect the shell 16 to the structural plates adjacent thereto. When the tube bundle modules 12 are vertically misaligned such as the top two horizontal bundle module rows of FIG. 1A, intermediate support structure 42, as shown in FIG. 6, must be utilized. Intermediate support structure 42 illustrated in FIG. 8 would be suitable for use in the case of vertically aligned tube bundle modules 12 such as the second and third horizontal tube bundle module rows of FIG. 1A. Intermediate support structure 42 is preferred over intermediate support structure 38 primarily because it is easier to field assemble and cheaper to fabricate to the accuracy required to maintain flat supporting surfaces for longitudinal support members 36. All structural support plates 44a, 44b, and 44c preferably constitute ½-inch carbon steel plate which is fillet welded to all intersecting pipe struts 46.

FIG. 9 illustrates tube bundle module 12 assembled in operating position. The view illustrated in FIG. 9 is taken at a tube support 30 disposed intermediate tube sheets 26. Tube bundle module longitudinal framework members 32 may be seen to mate with longitudinal support members 36. The intermediate support structure has been deleted from FIG. 9 for the sake of clarity. The condenser in an OTEC closed cycle includes collection tray 48 which constitutes a plate preferably welded between longitudinal support members 36 to collect the ammonia or other motive fluid condensate and prevent it from falling and overloading the next lowest tube bundle module 12. The evaporator in an OTEC closed cycle requires not only a collection tray 48 but also a distribution chamber 50 which is disposed above each tube bundle module 12 and comprises plates which are preferably welded to upper longitudinal support members 36. Ammonia supplied to distribution chamber 50 is sprayed through perforated plate 52 onto tubes 28 of tube bundle module 12. Distribution chamber 50 is preferred over a distribution tray since ammonia supplied to such chamber will not splash or spill onto the bundle module from ship movements caused by ocean turbulence. Additionally, the ammonia supplied to such chamber can be pressurized to promote and insure adequate flow through all holes in the perforated plate 52.

Utilizing modular tube bundles 12 with ammonia distribution and collection permits independent operation of the bundles and vastly improved shellside distribution over that of a single tube bundle.

Conduit 54 is illustrated in FIG. 9 as extending through tube support 30 at the lower center part of tube bundle module 12. Conduit 54 is provided with holes for removing non-condensible substances collected within the OTEC condenser. Conduit 54, as shown in FIG. 3, extends substantially the entire length of each tube bundle module 12 through the various tube supports 30 and exits through tube sheet 26. Evacuation of such non-condensibles to the atmosphere by use of compressors, air ejectors or other venting means increases the thermodynamic efficiency of the condenser and substantially reduces corrosion therein. It is to be understood that while venting conduit 54 is illustrated in the evaporator shown in FIG. 9, it is normally more widely used in the condenser rather than the evaporator. After insertion of all tube bundle modules 12 into shell 16, the tube plates 26 are welded to structural support boxes 24 to prevent tube side and shell side fluid intrusion therebetween.

Figure 10:
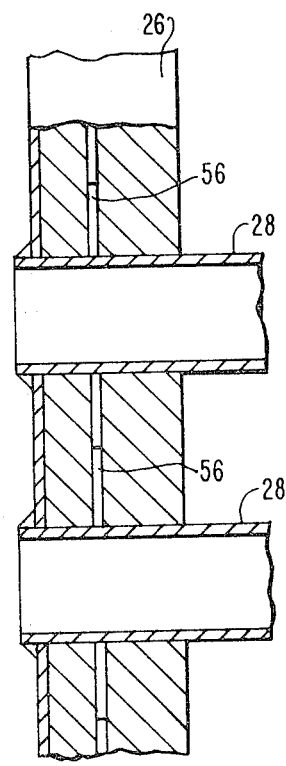
FIG. 10 is a partial sectional view of a tube sheet illustrating a leak detecting groove system therein.

FIG. 10 illustrates a partial sectional view of tube sheet 26 showing tubes 28 extending therethrough. The tubes 28 are welded to the clad face of tube sheet 26 and are each surrounded by a groove 56 which, when interconnected with selected other grooves and monitored for pressure changes, can be utilized for detecting and pinpointing leaks. The grooves 56 may be integral with the tube sheets 26 or can be the result of suitably fabricating the tube sheets as taught by assignee's copending application Ser. No. 888,724 which was filed Mar. 21, 1978.

The degree of leakage pinpointing can be selected by the proper interconnection of grooves, e.g. connect grooves in each tube row and monitor each interconnected tube row groove system. Such fluid leakage detection for each tube bundle module has significant advantages over leak detection for a large, single bundle heat exchanger.

It will now be apparent that a modular heat exchanger 10 has been provided in which tube bundle modules 12 can be built simultaneously to shorten manufacturing cycle time, can be constructed at existing manufacturing facilities using a variety of materials, are commercially shipable by rail or barge, allow for standarization of many constituent parts including tube sheets 26 which are smaller, thinner, and cheaper than a single large tube sheet, promotes modular bundle removal for future inspection and/or repair, minimizes expensive field labor, promotes shell side fluid distribution for efficient performance, and increases the feasibility of tube bundle model testing and extrapolation of its performance prior to building the entire heat exchanger 10.

I claim:

1. A modular shell and tube heat exchanger comprising:

a shell having a longitudinal axis;

a plurality of tube bundle-modules disposed in said shell in horizontal rows, each of said tube bundle modules constituting a plurality of tubes extending parallel to said longitudinal axis, a tube sheet disposed on each end of said tubes with said tubes extending therethrough, a plurality of tube supports disposed between said tube sheets and having openings therein for receiving said tubes, and a tube bundle module stiffening structure attached to said tube sheets and tube supports for maintaining said tube bundles' integrity and rigidity, said stiffening structure comprising a plurality of longitudinal framework members secured to the tube bundle module's tube supports and the tube sheets exclusively along the outer periphery of said module, said longitudinal framework members being substantially parallel to said shell's longitudinal axis and a plurality of transverse framework members diagonally disposed between said longitudinal framework members along the outer periphery of said module, said transverse members being secured to the edges of said tube supports and at least one longitudinal framework member, said framework members obstructing a small area of said module's outer periphery so as to permit access to all sides of said module;

a chamber disposed on each end of said shell wherein each of said chambers provides fluid communication to the tubes in all tube bundle-modules, said chamber on one end of said shell constituting a supply manifold common to said modules and said chamber on the other end of said shell providing an exhaust manifold common to said modules; and a support structure disposed in said shell for supporting said tube bundle-modules in said shell, said support structure having end, intermediate, and longitudinal members, said end members being disposed at both ends of said shell and being connected thereto in planes perpendicular to said shell's longitudinal axis, said end members in each plane forming a lattice of openings, said longitudinal members being disposed substantially parallel to said shell's longitudinal axis between said end lattice members, said end and longitudinal members together defining a plurality of voids into which said tube bundle-module are receivable, said intermediate support members being disposed in a plurality of planes perpendicular to said shell's longitudinal axis, and said intermediate support members comprising a plurality of structural plates disposed within the plane between said tube bundle modules, said plates having recesses therein for receiving the adjacent longitudinal support members and protrusions separating said recesses; and a plurality of struts disposed between the protrusions of adjacent structural plates, a plurality of said intermediate support members being connected to said shell and longitudinal members so as to provide support therefor.

2. The heat exchanger of claim 1 wherein a first portion of said structural plates is substantially X-shaped with the legs thereof constituting said protrusions.

3. The heat exchanger of claim 1 wherein a second portion of said structural plates is substantially T-shaped with the legs thereof constituting said protrusions.

4. The heat exchanger of claim 1 wherein a third portion of said structural plates is substantially L-shaped with the legs thereof constituting said protrusions.

* * * * *